Jan. 3, 1950 W. B. EMERICH 2,493,122
AIR CONDITIONING APPARATUS FOR VEHICLES
Filed Oct. 4, 1945 3 Sheets-Sheet 1
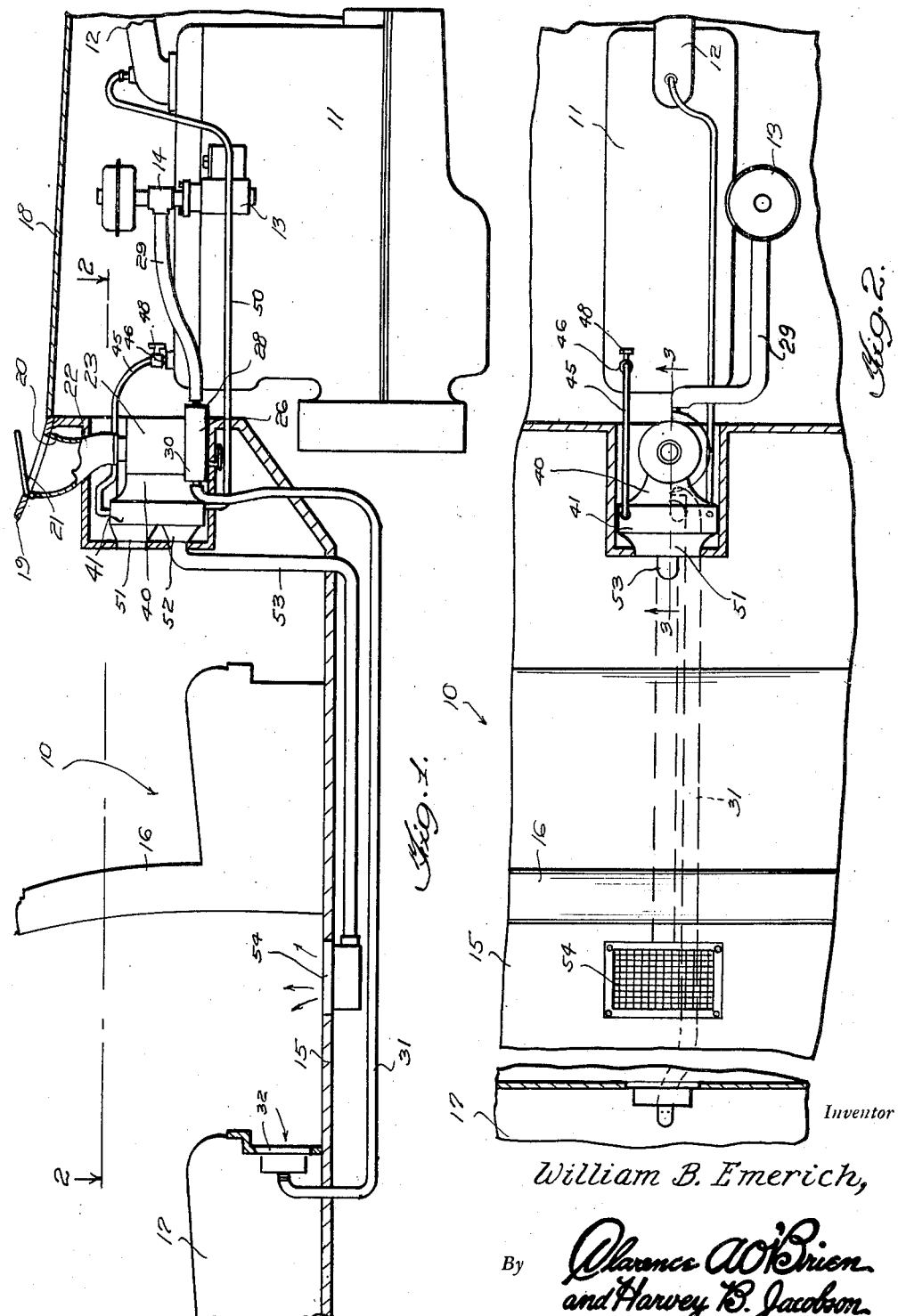
Inventor
William B. Emerich,
By Clarence A. O'Brien
and Harvey B. Jacobson
Attorneys

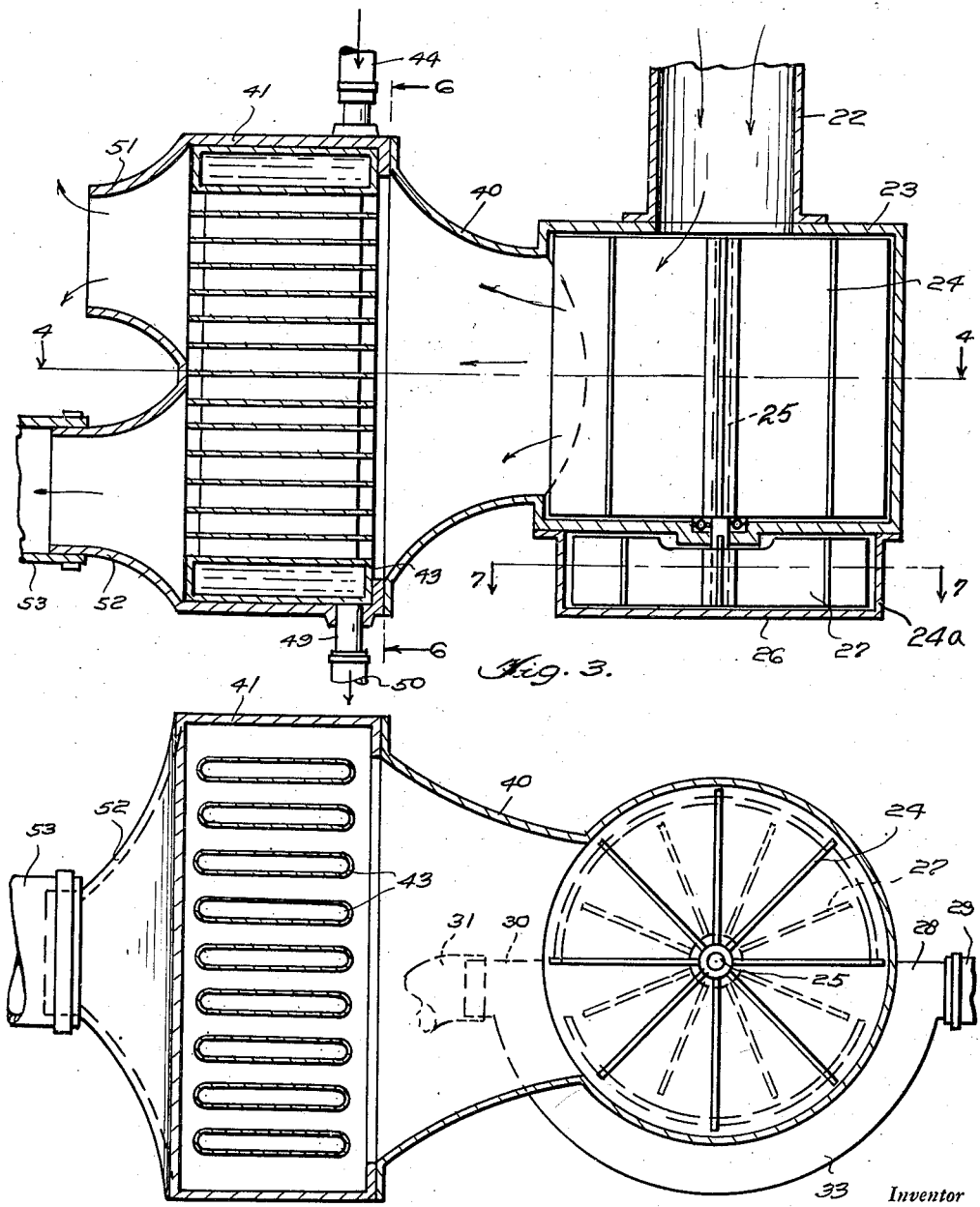

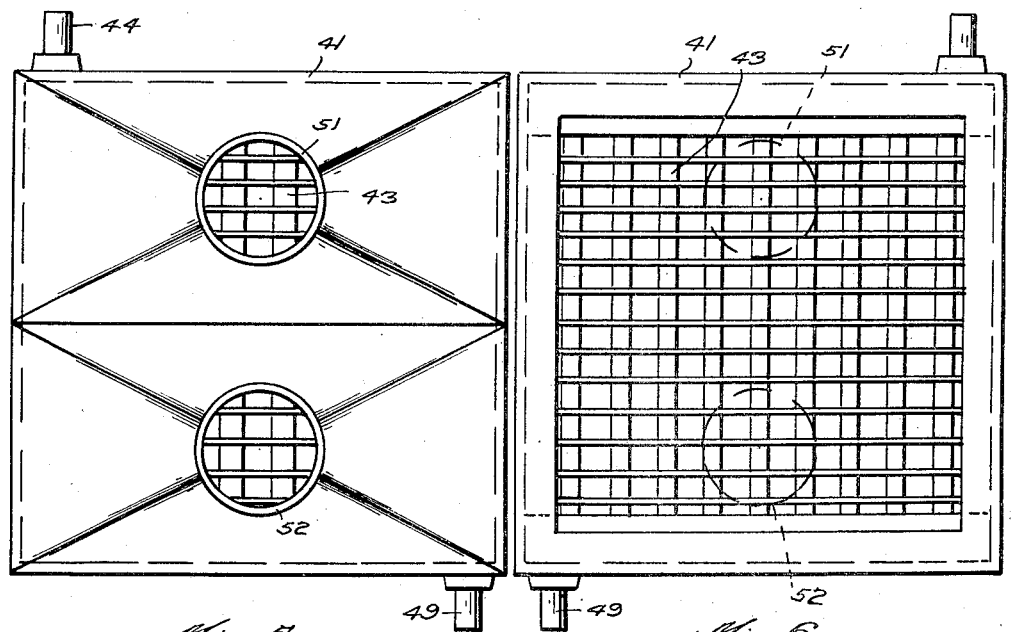
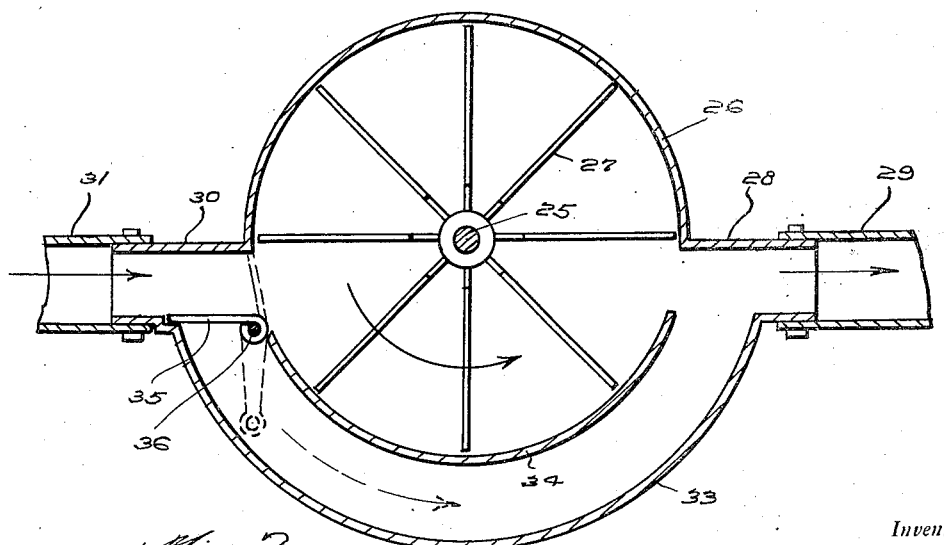

Patented Jan. 3, 1950

2,493,122

UNITED STATES PATENT OFFICE 2,493,122

AIR CONDITIONING APPARATUS FOR VEHICLES

William B. Emerich, Evansville, Ind.

Application October 4, 1945, Serial No. 620,279

5 Claims. (Cl. 237—12.3)

This invention relates to an air conditioning apparatus for vehicles, and more particularly to a built-in device adapted to be utilized for motor vehicles, such as passenger cars, or the like, for supplying heated or cool fresh air to the interior of the vehicle and exhausting stale air from the same.

A primary object of this invention is to condition the interior of a motor vehicle, such as a passenger car, by removal of stale air and fumes therefrom by continuously supplying fresh air thereto, either heated or cool, in accordance with prevailing weather conditions.

A further object of the invention is the provision of such an apparatus which will operate without the use of electrical current, and corresponding drain on the batteries of the vehicle.

An important feature of the invention is the provision of a suction motor adapted to be driven by the air intake to the carburetor of the internal combustion engine of the vehicle, the latter providing the sole source of power for the motor.

A further important feature of the invention is the provision of heating means in the path of air admitted to the interior of the vehicle heated solely by water from the radiator of the vehicle.

A further important feature of the invention is the provision of a relatively compact unitary device which may be formed as an integral part of a motor vehicle, and which will provide continuous circulation of fresh air therethrough at all times as may be desired.

Other objects will in part be obvious and in part be pointed out as the description of the invention proceeds and shown in the accompanying drawings, wherein there is disclosed a preferred embodiment of this inventive concept.

In the drawings:

Figure 1 is a side view partially in elevation and partially in section showing the apparatus comprising a feature of the instant invention as applied to a motor vehicle, only fragments of the latter being shown, Figure 2 is a sectional view taken substantially along the line 2—2 of Figure 1 as viewed in the direction indicated by the arrows, Figure 3 is an enlarged sectional view taken substantially along the line 3—3 of Figure 2 as viewed in the direction indicated by the arrows, Figure 4 is a sectional view taken substantially along the line 4—4 of Figure 3 as viewed in the direction indicated by the arrows, Figure 5 is a front elevational view of the radiator unit used in the present invention, Figure 6 is a sectional view taken substantially along the line 6—6 of Figure 3, as viewed in the direction indicated by the arrows, and Figure 7 is a sectional view taken substantially along the line 7—7 of Figure 3, as viewed in the direction indicated by the arrows.

Similar reference characters refer to similar parts throughout the several views of the drawings.

Having reference now to the drawings, and more particularly to Figures 1 and 2, there is generally indicated at 10 a motor vehicle, such as a passenger car, including an internal combustion engine 11 having a radiator 12, a carburetor 13, and a carburetor inlet 14. The vehicle includes a floor 15, front and rear seats 16 and 17, respectively, a hood 18 provided with a cowl 19 and having a cowl air inlet 20 provided with the customary louver 21.

From the air inlet 20 a conduit 22 leads to a housing 23, within which is mounted a blower 24, carried by an axle 25 suitably journaled in the side walls of housing 23, and extended into a casing 24a beneath the housing 23. A portion of the axle 25 in the casing 26 is provided with air impelling blades 27. As best shown in Figure 7, casing 26 is provided with an outlet 28 from which a conduit 29 leads to the air intake 14 of the carburetor 13. From the inlet 30 of the casing 26, a conduit 31 leads beneath the floor 15 of the vehicle to a register 32 preferably positioned vertically in the ledge of the rear seat 17, the register 32 forming an air inlet for the casing 26 in the interior of the vehicle.

Referring back to the casing 26, it will be seen that the same is provided with an integral bypass channel or passage 33 extending around substantially one half the outer wall 34 of the casing 26, to provide a by-pass passage from the inlet 30 to the outlet 28. A butterfly valve 35 pivotally mounted, as at 36, and controlled in any desired manner, as, for example, from a remote point on the dashboard of the vehicle, directs air from the inlet 30 either through the suction motor comprised of the blades 27 or around the same through the by-pass 33.

From the foregoing, it will now be seen that when the motor 11 is in operation, the suction in the air inlet leading to the carburetor will draw air from the register 32 through the suction motor, thus rotating the blades of the same when the butterfly valve 35 is in the position shown in full lines in Figure 7. Obviously, when the valve is in the dotted line position, and the air is by-passed around the suction motor, the same will be rendered inoperative. Rotation of the blades 27 will correspondingly rotate the axle 25, and through the blower 24 pass air from the inlet 22 through a passage 40 into a receptacle or radiator unit 41, which contains a plurality of water-filled cells 43, connected in the customary manner, and adapted to have warm water circulated therethrough, the water entering through an inlet 44 connected as by a tube 45 to an outlet 46 of the water circulating system of the engine. A valve 48 may be utilized to control the admission of hot water to the cells. An outlet 49 connects with a tube 50 which in turn provides a return line to the water circulating system. Obviously, the flow of water to and from the cells may be controlled by means of the valve 48, and the hot water circulation may be shut off entirely when it is desired to admit cool air to the vehicle. Receptacle 41 is provided with two outlets 51 and 52, the outlet 51 opening directly into the interior of the vehicle adjacent the front seat 16 thereof, and the opening 52 extending into a tube or conduit 53 which extends beneath the floor of the vehicle to a register 54 positioned between the front and rear seats.

From the foregoing, it will now be seen that there is herein provided a conditioning system for vehicles by means of which fresh air may be constantly circulated into and out of the motor vehicle, which fresh air may be readily heated in the manner previously described, and which accomplishes all the objects of this invention and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. An air conditioning apparatus for motor vehicles comprising inlet means for delivering air into and outlet means for withdrawing air from the interior of a mtor vehicle, an air blower in said inlet means, an air motor in said outlet means operable by the flow of air therethrough, driving means connecting said motor with said blower, said outlet means being connected with the carburetor air intake of a vehicle motor, a by-pass about said air motor, and a valve controlling said by-pass.

2. The combination of claim 1 wherein said inlet means has an inlet opening communicating with the atmosphere.

3. An air conditioning apparatus for motor vehicles comprising means for constantly drawing air into the vehicle, circulating said air within said vehicle and discharging said air into the carburetor air intake of the engine of said vehicle, means for heating said air from the waste heat of said engine before its introduction into the interior of said vehicle, blower means for causing a flow of air through said first means, motor means for driving said blower said motor means being operated by the movement of air during its discharging into said induction system, and a valved by-pass about said motor means.

4. In a motor vehicle having a cooling system, a carburetor having an air intake and a cowl air inlet; an air conditioning apparatus comprising a housing having an inlet and outlet, a conduit between the inlet of said housing and said cowl for supplying air into the housing, a casing carried by said housing and having an inlet and outlet, another conduit connecting the outlet of said casing to the air intake of the carburetor, a shaft extending through the housing and the casing, first blades mounted on said shaft and disposed in said casing and adapted to draw air into the inlet of said casing upon rotation of said first blades, second blades mounted on said shaft, and rotatable with said first blades, said second blades being disposed in said housing for directing air through the outlet of said housing upon rotation of said second blades, an air heater carried by said housing and having an inlet port connected to the outlet of said housing and an outlet disposed in the interior of the vehicle, said heater being connected to the cooling system of the vehicle, a by-pass about said casing and between the inlet and outlet thereof, and valve means controlling said by-pass.

5. The combination of claim 4 wherein said valve means is disposed at the inlet of said casing for selectively blocking the entrance of air into said casing and said by-pass.

WILLIAM B. EMERICH.

REFERENCES CITED

The following references are of record in the file of this patent:

UNITED STATES PATENTS

| Number | Name | Date |
| --- | --- | --- |
| 1,742,753 | Caller | Jan. 7, 1930 |
| 1,986,405 | Mears | Jan. 1, 1935 |
| 2,072,744 | Findley | Mar. 2, 1937 |
| 2,081,696 | Cornell | May 25, 1937 |
| 2,100,281 | Hueber et al. | Nov. 23, 1937 |
| 2,105,497 | Palmer | Jan. 18, 1938 |
| 2,116,145 | Findley | May 3, 1938 |
| 2,146,845 | Payne | Feb. 14, 1939 |
| 2,218,265 | Norwood | Oct. 15, 1940 |
| 2,316,421 | Hans | Apr. 13, 1943 |